US009179369B2

(12) United States Patent
Chun et al.

(10) Patent No.: US 9,179,369 B2
(45) Date of Patent: Nov. 3, 2015

(54) APPARATUS AND METHOD FOR PERFORMING A HANDOVER IN A WIRELESS COMMUNICATION SYSTEM

(75) Inventors: Jin Young Chun, Anyang-si (KR); Ki Seon Ryu, Anyang-si (KR); In Uk Jung, Anyang-si (KR); Jin Lee, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 13/202,069

(22) PCT Filed: Feb. 19, 2010

(86) PCT No.: PCT/KR2010/001027
§ 371 (c)(1),
(2), (4) Date: Aug. 17, 2011

(87) PCT Pub. No.: WO2010/095876
PCT Pub. Date: Aug. 26, 2010

(65) Prior Publication Data
US 2011/0299446 A1   Dec. 8, 2011

Related U.S. Application Data

(60) Provisional application No. 61/153,968, filed on Feb. 19, 2009, provisional application No. 61/237,692, filed on Aug. 28, 2009.

(30) Foreign Application Priority Data

Feb. 16, 2010   (KR) .................... 10-2010-0013688

(51) Int. Cl.
*H04W 36/00* (2009.01)
*H04W 72/04* (2009.01)
(Continued)

(52) U.S. Cl.
CPC .......... *H04W 36/0016* (2013.01); *H04W 36/04* (2013.01); *H04W 72/04* (2013.01); *H04W 84/045* (2013.01); *Y02B 60/50* (2013.01)

(58) Field of Classification Search
None
See application file for complete search history.

(56) References Cited

U.S. PATENT DOCUMENTS 5,175,867 A * 12/1992 Wejke et al. ................. 455/439
2006/0034240 A1* 2/2006 Kwak et al. ................. 370/342
(Continued)

FOREIGN PATENT DOCUMENTS

KR   10-2009-0008055 A   1/2009
WO   2010/095876 A2      8/2010

OTHER PUBLICATIONS

Sunggeun Jin et al., 'Handoff procedure in the 802. 16m Femto cell environments' IEEE C802. 16m-08/1408, Oct. 31, 2008 See chapter 1, chapter 3.

(Continued)

*Primary Examiner* — Ashley Shivers
(74) *Attorney, Agent, or Firm* — Dentons US LLP

(57) ABSTRACT

A method of performing a handover in a wireless communication system employing a macro base station and a femto base station is provided. The method comprising: monitoring an uplink signal transmitted from a user equipment to the macro base station; transmitting a handover initiation message to the macro base station on the basis of a result of comparing the uplink signal's strength obtained by the monitoring with a reference value; and performing a handover of the user equipment from the macro base station to the femto base station. According to the present invention, there is provided a method of initiating a handover by a femto base station by fining user equipments located in a cell coverage of the femto base station. In addition, a signaling overhead is reduced by utilizing previously existing information such as uplink transmit power.

6 Claims, 6 Drawing Sheets

(51) Int. Cl.
*H04W 36/04* (2009.01)
*H04W 84/04* (2009.01)

(56) References Cited

U.S. PATENT DOCUMENTS

| | | | |
|---|---|---|---|
| 2006/0154671 A1* | 7/2006 | Kang et al. | 455/450 |
| 2007/0104177 A1* | 5/2007 | Hwang et al. | 370/348 |
| 2008/0056193 A1* | 3/2008 | Bourlas et al. | 370/331 |
| 2008/0153497 A1* | 6/2008 | Kalhan | 455/436 |
| 2008/0232323 A1* | 9/2008 | Jeong et al. | 370/331 |
| 2008/0305801 A1 | 12/2008 | Burgess et al. | |
| 2009/0129341 A1* | 5/2009 | Balasubramanian et al. | 370/331 |
| 2009/0279502 A1* | 11/2009 | Zheng et al. | 370/331 |
| 2009/0312024 A1* | 12/2009 | Chen et al. | 455/437 |
| 2010/0067491 A1* | 3/2010 | Park et al. | 370/332 |
| 2010/0128694 A1* | 5/2010 | Choi-Grogan | 370/331 |
| 2010/0130209 A1* | 5/2010 | Florkey et al. | 455/437 |

OTHER PUBLICATIONS

Noh, Mi Jin; Kim, Ju Seong, 'An Analysis of the Trend and Business Model of Femtocell in the Age of Fixed-Mobile Convergence.', Electronic Telecommunication Trend Analysis vol. 23, No. 2, Apr. 2008 See chapter I , chapter II.

* cited by examiner

APPARATUS AND METHOD FOR PERFORMING A HANDOVER IN A WIRELESS COMMUNICATION SYSTEM This application is a 35 U.S.C. §371 National Stage entry of International Application No. PCT/KR2010/001027, filed on Feb. 19, 2010, and claims priority to U.S. Provisional Application No. 61/153,968, filed Feb. 19, 2009, U.S. Provisional Application No. 61/237,692, filed Aug. 28, 2009, and Korean Application No. 10-2010-0013688, filed Feb. 16, 2010, each of which is hereby incorporated by reference in its entirety as if fully set forth herein.

TECHNICAL FIELD

The present invention relates to wireless communications, and more particularly, to an apparatus and method for performing a handover in a wireless communication system.

BACKGROUND ART

With the development of communication and the spread of multimedia technology, a wireless communication system uses various techniques for massive data transmission. A method of assigning a more number of frequency resources may be used as a method of increasing radio capacity. However, since the number of frequency resources is limited, there is a limitation when the more number of frequency resources are assigned to a plurality of users. As one of methods for effectively utilizing the limited frequency resources, there is a method of creating a small-sized cell. When the small-sized cell is created, one base station (BS) provides a service to a less number of users, and thus the BS can assign a more number of frequency resources to the users. By creating the small-sized cell, a service for massive data transmission with better quality can be provided to the plurality of users.

To increase system efficiency and to improve quality of service (QoS) in an indoor environment, a protocol standardization work for a wireless access system supporting a femto-cell is in progress in the institute of electrical and electronics engineers (IEEE) 802.16 task group which defines a next generation wireless interface standard and in the worldwide interoperability for microwave access (WiMAX) forum which is an non-profit organization providing a service and a network protocol for an IEEE 802.16-based broadband wireless access system. In the WiMAX forum, a femto BS is defined as a low-power low-cost BS connected with an Internet protocol (IP) network through a fixed wireless link or a local broadband wired link. The femto BS is connected to the IP network widely used in homes or offices, and provides a mobile communication service by accessing a core network of a mobile communication system. That is, the femto BS may be connected to the core network of the mobile communication system through a digital subscriber line (DSL). A user of the mobile communication system may receive a service via a conventional macro-cell in an outdoor environment, and may receive a service via a femto-cell in an indoor environment. The femto-cell improves indoor coverage of the mobile communication system by correcting a problem in which the conventional macro-cell provides a deteriorating service inside a building. Since the femto-cell can provide a service only to a specific designated user, a voice service and a data service can be provided with high quality. Further, the femto-cell can provide a new service not provided by the macro-cell. With the wide use of the femto-cell, fixed-mobile convergence (FMC) can gain a momentum, and industry-based costs can be reduced.

In general, a cell coverage of the femto BS is smaller than a cell coverage of the macro BS, and the cell coverage of the femto BS may be entirely or partially included in the cell coverage of the macro BS. In a case where a user equipment (UE) belonging to the cell coverage of the macro BS performs communication, if the UE also belongs to the cell coverage of the femto BS, it may be advantageous to perform a handover from the macro BS to the femto BS. The same also applies in the opposite case. A handover may be initiated by the UE, the macro BS, or the femto BS. A handover initiated by the UE is a UE-initiated handover. A handover initiated by the macro BS is a BS-initiated handover.

The UE-initiated handover may be performed by the UE by directly measuring a signal of a neighbor BS and transmitting to the macro BS a message for requesting a handover to a desired BS. On the other hand, the BS-initiated handover may be performed by the macro BS by transmitting a handover command message to the UE.

The BS-initiated handover may also be performed by the femto BS. In this case, the femto BS directly scans neighbor UEs and allows a desired UE to initiate a handover from the macro BS to the femto BS. However, a method of performing a handover initiated by the femto BS has not been clearly defined up to now. Accordingly, there is a need for an apparatus and method for performing a handover in a wireless communication system employing a macro BS and a femto BS.

DISCLOSURE

Technical Problem

The present invention provides an apparatus and method for initiating a handover by a femto base station when a user equipment is handed over from a macro base station to the femto base station.

Technical Solution

According to an aspect of the present invention, a method of performing a handover in a wireless communication system employing a macro base station and a femto base station is provided. The method comprising: monitoring an uplink signal transmitted from a user equipment to the macro base station; transmitting a handover initiation message to the macro base station on the basis of a result of comparing the uplink signal's strength obtained by the monitoring with a reference value; and performing a handover of the user equipment from the macro base station to the femto base station.

According to other aspect of the present invention, an apparatus for performing a handover in a wireless communication system is provided. The apparatus comprising a processor for monitoring an uplink signal transmitted from a user equipment to a macro base station, for transmitting a handover initiation message to the macro base station on the basis of a result of comparing the uplink signal's strength obtained by the monitoring with a reference value, and for performing a handover of the user equipment from the macro base station to a femto base station.

Advantageous Effects

According to the present invention, there is provided a method of initiating a handover by a femto base station by fining user equipments located in a cell coverage of the femto base station. In addition, a signaling overhead is reduced by utilizing previously existing information such as uplink transmit power.

MODE FOR INVENTION

Embodiments of the present invention will be described hereinafter with reference to the accompanying drawings so that the invention can be easily implemented by those skilled in the art. The present invention can be implemented in various different forms and is not limited to the embodiments described herein. Throughout the drawings, parts irrelevant to the present invention are omitted for clarity, and the same reference numbers will be used to refer to the same or like parts. Further, various details that can be easily understood by those skilled in the art will be omitted.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Figure 1:
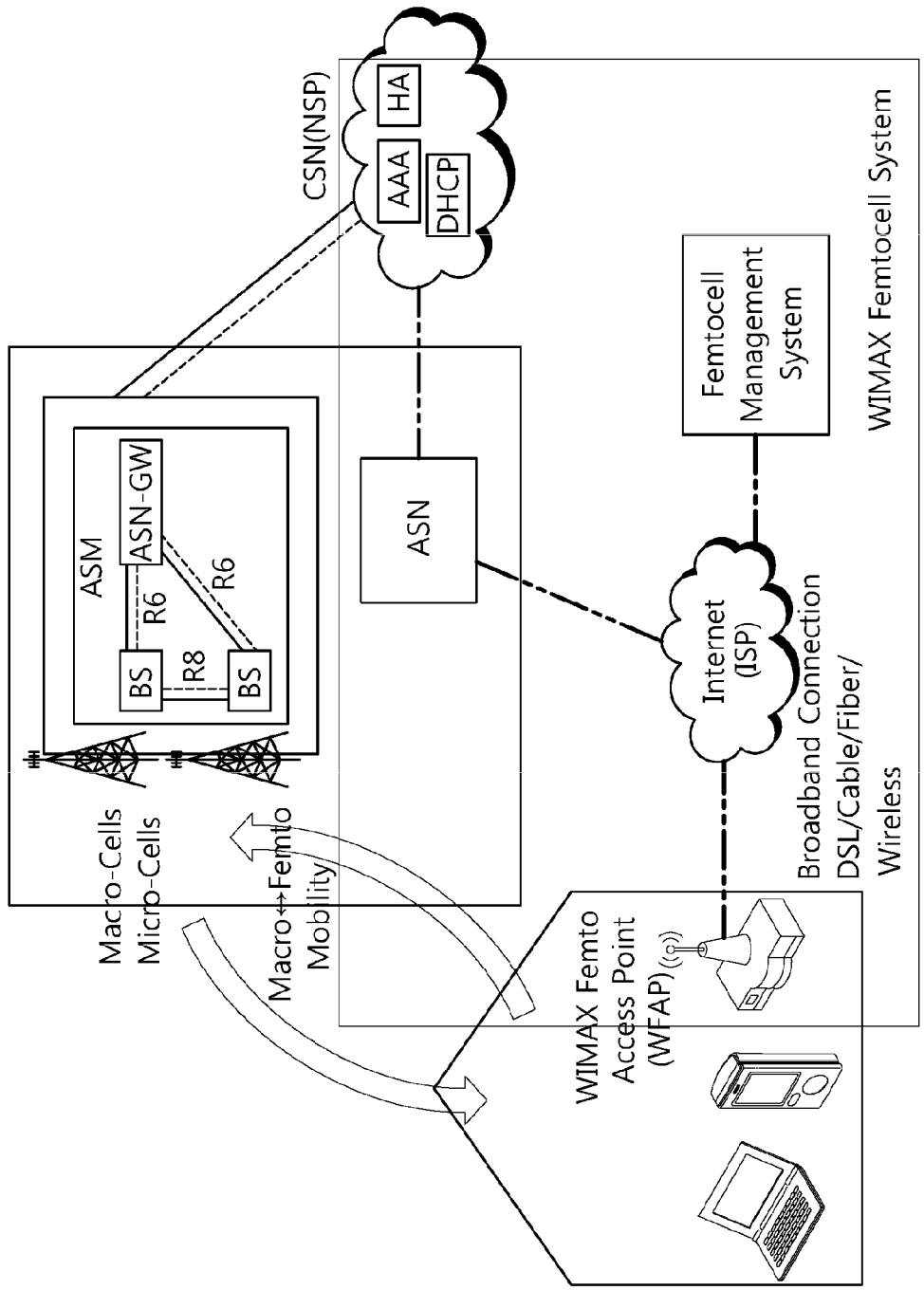
FIG. 1 shows an example of a WiMAX system structure supporting a femto-cell.

FIG. 1 shows an example of a WiMAX system structure supporting a femto-cell.

Referring to FIG. 1, a typical wireless communication system includes a user equipment (UE) and a base station (BS). The wireless communication system can be widely deployed to provide a variety of communication services, such as voices, packet data, etc.

The UE may be fixed or mobile, and may be referred to as another terminology, such as a mobile station (MS), an advanced mobile station (AMS), a user terminal (UT), a subscriber station (SS), a wireless device, etc. The BS is generally a fixed station that communicates with the UE and may be referred to as another terminology, such as an advanced base station (ABS), a node-B, a base transceiver system (BTS), an access point, etc. There may be one or more cells within the coverage of the BS.

The BS may be classified into a femto BS and a macro BS according to cell coverage or deployment. In general, the femto BS operates within a permitted frequency range, and may use the same frequency band as the macro-cell or may use a frequency band different from that used in the macro-cell. A cell coverage of the femto BS is smaller than a cell coverage of the macro BS. The cell coverage of the femto BS may overlap entirely or partially with the cell coverage of the macro BS. As such, a structure in which a small-ranged cell is repetitively positioned in a wide-range cell is referred to as a hierarchy cell structure. The femto BS may also be referred to as other terminologies, such as a femto-cell, a home node-B, a closed subscribed group (CSG), a WiMAX femto access point (WFAP), etc. To distinguish from the femto-cell, a cell of the macro BS may also be referred to as a macro-cell.

A UE accessing the femto BS is referred to as a femto UE. A UE accessing the macro BS is referred to as a macro UE. When the femto UE is handed over to the macro BS, the femto UE may become the macro UE. When the macro UE is handed over to the femto BS, the macro UE may become the femto UE.

The femto BS can establish a broadband connection over the Internet provided by an Internet service provider (ISP) by using a digital subscriber line (DSL), a cable, an optical fiber, a wireless connection, etc. The femto BS may be connected through the Internet to an access service network (ASN) of a femto-cell management system and a mobile communication system. The femto-cell management system may perform a registration, authentication, and security procedure or the like of the femto BS so that the femto BS can access a connectivity service network (CSN) of the mobile communication system.

A femto BS for an open subscriber group (OSG) operates like the macro BS when calling a UE. A femto BS for a closed subscriber group (CSG) may broadcast a paging message only for a UE belonging to a corresponding CSG. Only permitted UEs can attempt an access to the CSG femto BS. The OSG and CSG for the support of the femto BS may be defined in reference to 'system description document (SDD) of the IEEE 802.16 Task Group m'.

A downlink represents a communication link from a BS to a UE, and an uplink represents a communication link from the UE to the BS. In the downlink, a transmitter may be a part of the BS, and a receiver may be a part of the UE. In the uplink, the transmitter may be a part of the UE and the receiver may be a part of the BS.

Figure 2:
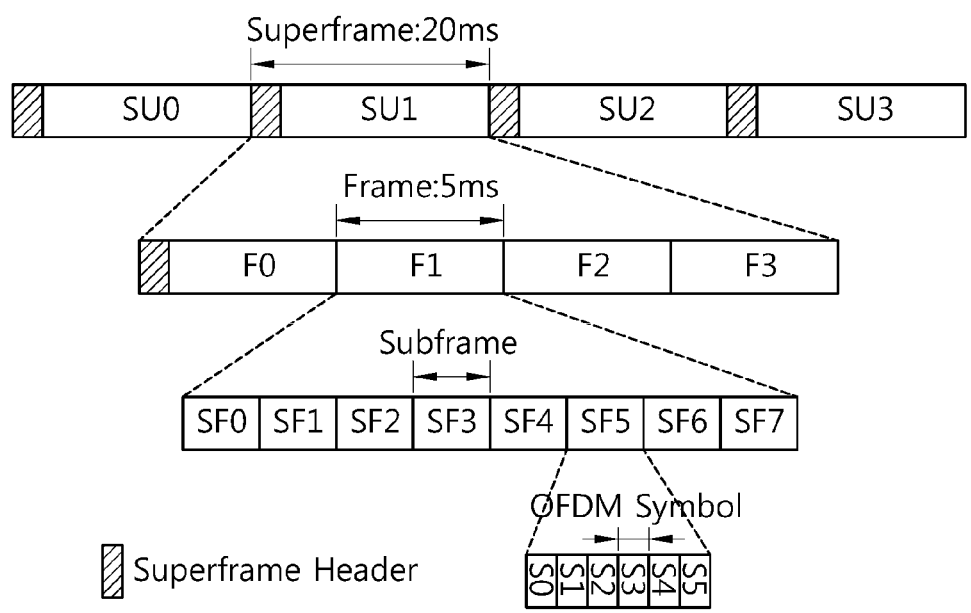
FIG. 2 shows an example of a frame structure.

FIG. 2 shows an example of a frame structure. This structure may be a frame structure of at least one of a macro-cell and a femto-cell in a hierarchy cell structure.

Referring to FIG. 2, a superframe includes a superframe header (SFH) and four frames F0, F1, F2, and F3. Although it is shown that each superframe has a size of 20 milliseconds (ms) and each frame has a size of 5 ms, the present invention is not limited thereto. The SFH may be located at a front-most position of the superframe. A common control channel is assigned to the SFH. The common control channel is used to transmit information regarding frames constituting the superframe or control information (e.g., system information) that can be commonly utilized by all UEs within a cell. A synchronization channel for transmitting a synchronization signal may be deployed either inside or adjacent to the SFH. The synchronization signal may represent cell information such as a cell identifier (ID).

One frame includes a plurality of subframes SF0, SF1, SF2, SF3, SF4, SF5, SF6, and SF7. Each subframe can be used for uplink or downlink transmission. Each subframe may consist of 6 or 7 OFDM symbols, but this is for exemplary purposes only. Time division duplexing (TDD) or frequency division duplexing (FDD) may be applied to the frame. In the TDD, each subframe is used in uplink or downlink transmission at the same frequency and at a different time. That is, subframes included in a TDD-based frame are divided into an uplink subframe and a downlink subframe in a time domain. In the FDD, each subframe is used in uplink or downlink transmission at the same time and at a different frequency. That is, subframes included in an FDD-based frame are divided into an uplink subframe and a downlink subframe in a frequency domain. Uplink transmission and downlink transmission can be simultaneously performed while occupying different frequency bands. Each subframe may include a subframe header. The subframe header may include radio resource allocation information of a subframe.

Hereinafter, a handover performed by a femto BS will be described.

Figure 3:
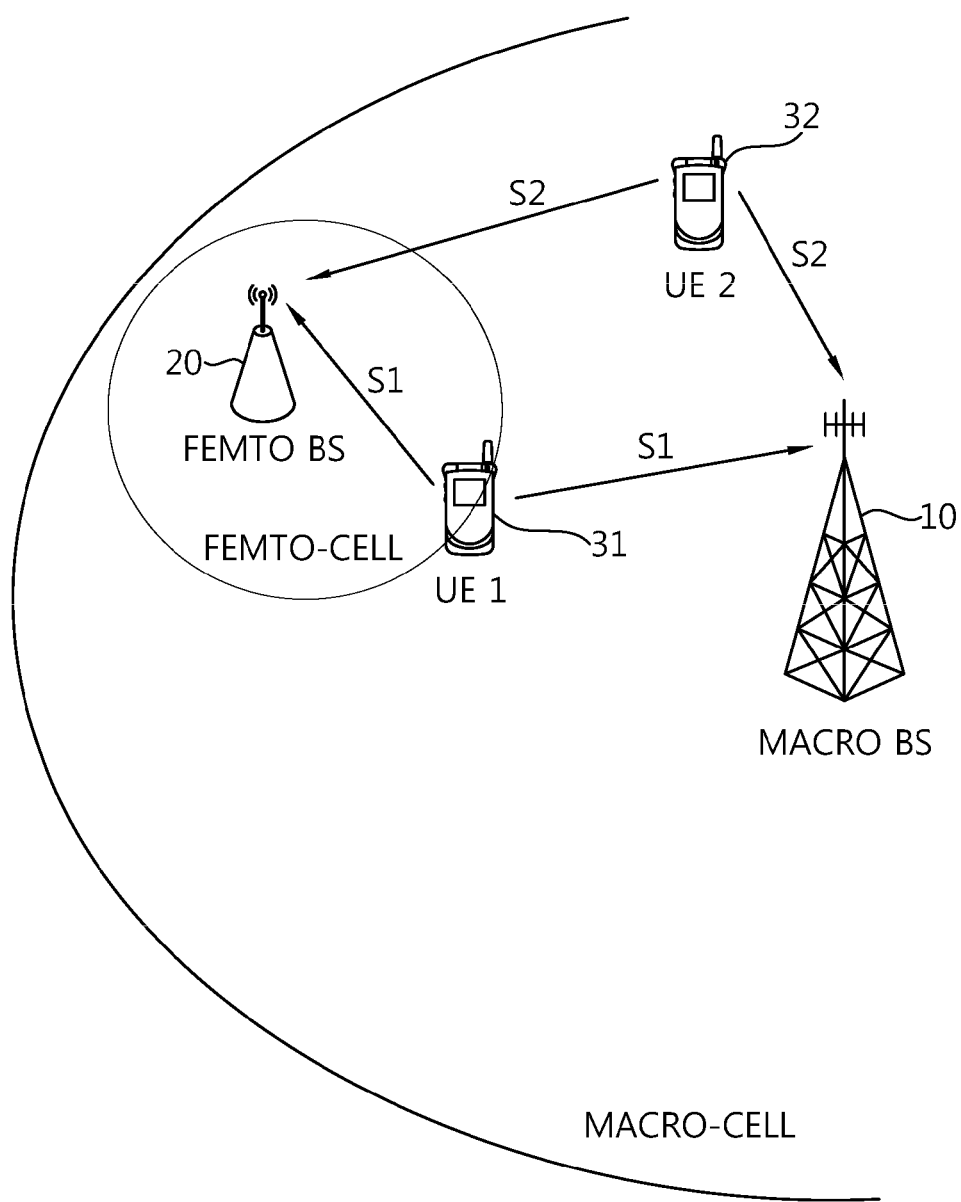
FIG. 3 shows a scenario in which a UE performs a handover from a macro BS to a femto BS according to the present invention.

FIG. 3 shows a scenario in which a UE performs a handover from a macro BS to a femto BS according to the present invention.

Referring to FIG. 3, a femto BS 20, a UE-1 31, and a UE-2 32 are included in a cell coverage of a macro BS 10. The UE-1 31 is also included in a cell coverage of the femto BS 20. Both of the UE-1 31 and the UE-2 32 perform communication through a radio interface of the macro BS 10.

If it is more advantageous for the UE-1 31 to perform communication through a radio interface of the femto BS 20, the UE-1 31 may perform a handover from the macro BS 10 to the femto BS 20. The handover from the macro BS 10 to the femto BS 20 may be performed in a UE-initiated manner or a BS-initiated manner.

In particular, a process of initiating a handover by the femto BS will be described. If S1 denotes a signal transmitted by the UE-1 31 and S2 denotes a signal transmitted by the UE-2 32, the signals S1 and S2 can be sensed not only by the macro BS 10 which is an actual receiving entity but also by the femto BS 20 since both of the signals S1 and S2 are transmitted in a radial direction according to a characteristic of a radio signal. The femto BS 20 monitors a signal transmitted by each UE to find a UE belonging to the cell coverage of the femto BS 20. By using signal strength obtained for the signals S1 and S2 as a result of the monitoring, the femto BS 20 can obtain locations of the UE-1 31 and the UE-2 32, more exactly, a distance between the femto BS 20 and the UE-1 31 and a distance between the femto BS 20 and the UE-2 32.

If the UE-1 31 exists in the cell coverage of the femto BS 20 and thus the femto BS 20 determines that a handover is necessary, the femto BS 20 may request a handover of the UE-1 31 to the macro BS 10.

As such, the handover initiated by the femto BS 20 may include a monitoring process, a process of determining whether a handover is necessary, and a process of requesting a handover of the UE to the macro BS 10.

The above processes will be described hereinafter in greater detail in reference to the accompanying drawings.

Figure 4:
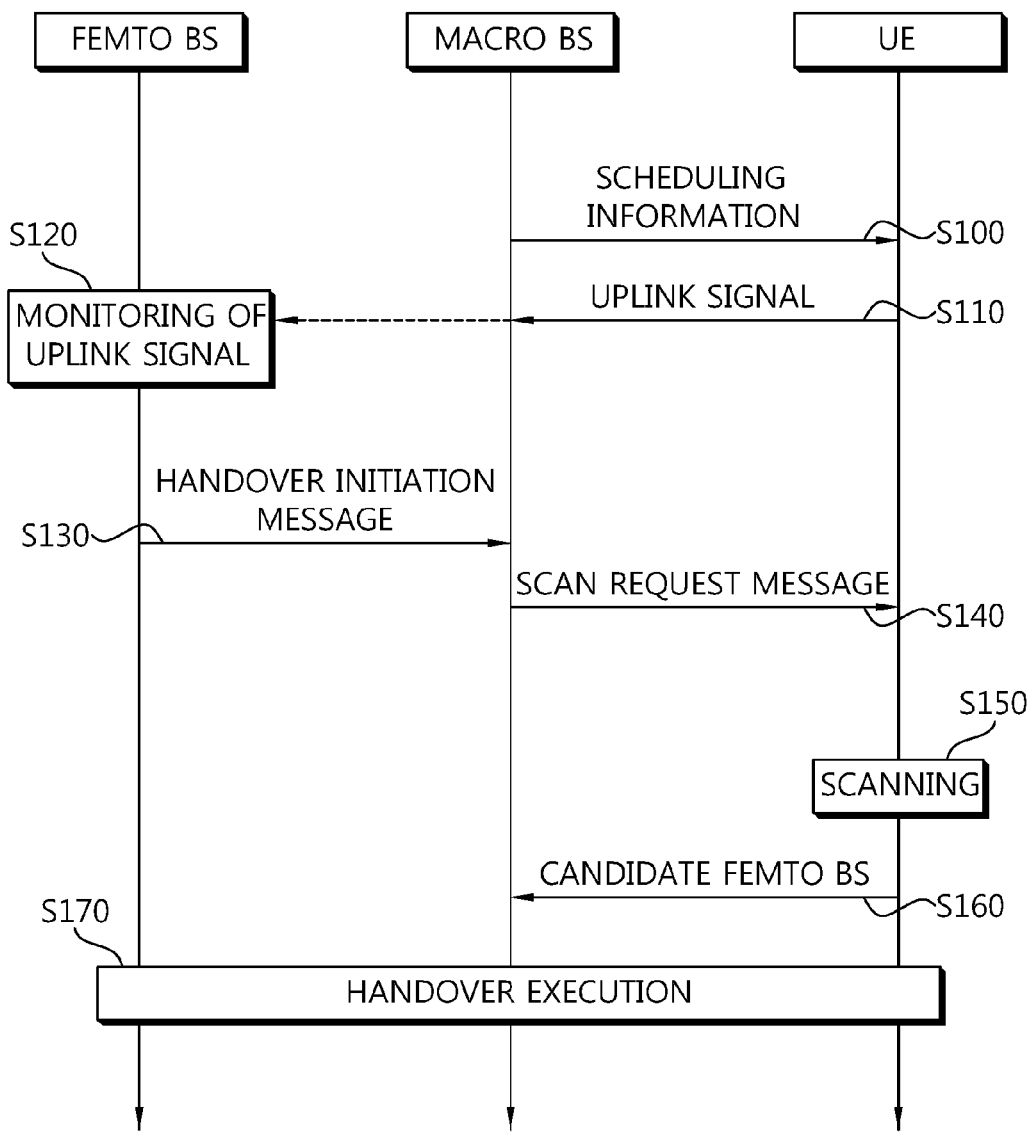
FIG. 4 is a flowchart for explaining a method of performing a handover initiated by a femto BS according to an embodiment of the present invention.

FIG. 4 is a flowchart for explaining a method of performing a handover initiated by a femto BS according to an embodiment of the present invention.

Referring to FIG. 4, a macro BS transmits scheduling information to a UE (step S100). The scheduling information includes not only resource allocation information regarding uplink transmission and downlink transmission of the UE but also information such as an uplink transmission period or transmit power. The UE transmits an uplink signal to the macro BS on the basis of the scheduling information (step S110). The femto BS monitors the uplink signal transmitted from the UE to the macro BS (step S120). Monitoring is a process of measuring received signal quality such as received signal strength indication (RSSI). In order for the femto BS to perform monitoring, negotiation needs to be first achieved with the macro BS for the uplink signal to be monitored.

For example, the uplink signal to be monitored may be uplink data. The uplink data may include a header field as shown in the following table.

TABLE 1

| Name | Length (bit) | Description |
|---|---|---|
| Type | 3 | The type of PHY channel report header is defined in Table 7. |
| PREFERRED-DIUC | 4 | Index of the DIUC preferred by the MS. |
| UL-TX-POWER | 8 | UL Tx power level in dBm for the burst that carries this header (11.1.1). The value shall be estimated and reported for the burst. |
| UL-HEADROOM | 6 | Headroom to UL maximum power level in dB, for the burst that carries this header, from 0 to 63 in 1 dB steps. Should the headroom exceed 63 dB, the value 63 shall be used. The value repoirted shall represent the difference between the maximum output power and the maximum power transmitted during the burst. |
| Reserved | 1 | Set to zero. |
| CID | 16 | MS basic connection identifier. |
| HCS | 8 | Header check sequence (same usage as HCS entry in Table 5). |

Referring to Table 1, a physical channel report header field includes a variety of information such as type information, a preferred downlink interval usage code (DIUC), uplink (UL) transmit (Tx) power, UL headroom, etc. Herein, the UL Tx power is information indicating a power level used by the UE in uplink transmission and is represented in dB.

To monitor the uplink data, the femto BS has to know a UE group which is a group of UEs to be monitored by the femto BS, and also has to know scheduling information allocated to the UE group. Therefore, when the macro BS transmits the UE group information and scheduling information in advance to the femto BS through a backbone network (this process is not shown in FIG. 4), the femto BS can monitor an uplink data signal of the UE group. Further, the macro BS may instruct the UE to insert the header field including the UL Tx power to the uplink data (this process is not shown in FIG. 4), and such an instruction may be transmitted by using the scheduling information. The scheduling information may also be referred to as a UL medium access control (MAC) message, a UL grant message, a UL MAP, or a physical downlink control channel (PDCCH).

For another example, the uplink signal to be monitored may be uplink control information. The uplink control information may be any information indicating a state of a downlink channel, such as channel quality information (CQI), a fast feedback channel (FFBCH), a periodic ranging message, an uplink reference signal, and a physical uplink control channel (PUCCH). The uplink control information may be transmitted in a periodic manner according to a persistent allocation scheme. Therefore, the femto BS can know a transmission time of the uplink control information without the use of additional scheduling information, and thus monitoring can be effectively performed. In this case, the macro BS may instruct the UE to transmit the uplink control information in a periodic manner and according to pre-determined Tx power.

If the uplink control information is the periodic ranging message, the periodic ranging message may be a message depending on dedicated periodic ranging dedicatedly allocated to the UE. In this case, the femto BS may monitor a ranging preamble in a dedicated ranging slot of the macro BS.

The femto BS transmits a handover initiation message to the macro BS according to a result obtained by comparing the uplink signal's strength obtained as a result of the monitoring with a reference value (step S130).

For one example, the reference value is a Tx power value included in the uplink data. In this case, the Tx power value is equal to the UL Tx power of the header field included in the uplink data as shown in Table 1 above. Therefore, the femto BS reads out the Tx power value from the uplink data and compares this value with the uplink signal's strength. Then, by using a difference between the uplink signal's strength with the reference value, the femto BS can obtain a distance between the femto BS and the UE. According to the distance, the femto BS can determine whether the UE exists in the coverage of a femto-cell. If it is determined that the UE is located within the coverage of the femto-cell, the femto BS transmits to the macro BS a handover initiation message for requesting initiation of a handover of the UE.

For another example, the reference value may be UL Tx power pre-determined between the UE, the femto BS, and the macro BS. In this case, the femto BS predicts a distance between the femto BS and the UE by comparing the uplink signal's strength with the pre-determined UL Tx power. If it is determined that the UE is located in the coverage of the femto-cell, the femto BS transmits to the macro BS the handover initiation message for requesting initiation of a handover of the UE.

For another example, the reference value may be a pre-determined handover threshold known to the UE, the femto BS, and the macro BS. That is, if the uplink signal's strength is greater than the handover threshold, it is determined that the UE exists in the coverage of the femto-cell and thus the handover initiation message is transmitted. On the other hand, if the uplink signal's strength is less than the handover threshold, it is determined that the UE does not exist in the coverage of the femto-cell and thus a handover-related operation is not performed.

The handover initiation message may be a message for instructing the UE to perform a scanning operation for finding a neighbor femto BS. Therefore, when the macro BS receives the handover initiation message, the macro BS transmits to the UE a scan request message for requesting the UE to scan the neighbor femto BS (step S140). The UE performs scanning (step S150), and reports to the macro BS a candidate femto BS to which the UE intends to be handed over (step S160). The handover is prepared on the basis of the candidate femto BS.

The UE is handed over from the macro BS to the femto BS (step S170). This step of performing a handover may be achieved in such a manner that the femto BS transmits a handover request message to the macro BS, and in response thereto, receives a handover response message from the macro BS.

As described in the above explanation, there is an advantage in that a handover is more effectively performed in a sense that negotiation on monitoring becomes clear between the femto BS and the macro BS, and the femto BS can initiate a handover of the UE by directly monitoring a signal of a neighbor UE.

Figure 5:
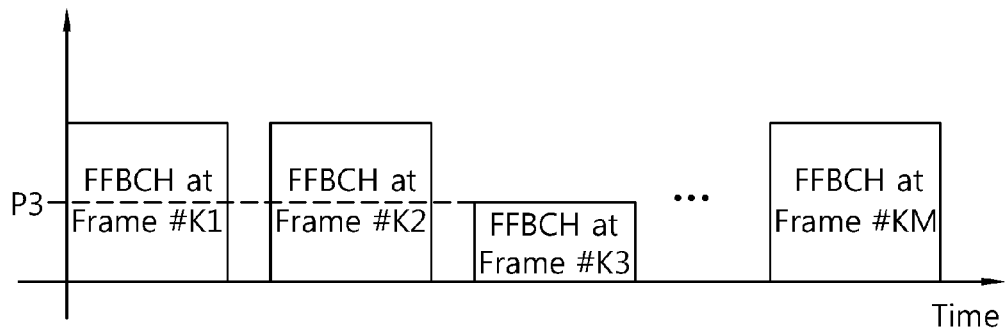
FIG. 5 is a view for explaining a process of transmitting an uplink signal by a UE to monitor a femto BS according to an embodiment of the present invention.

FIG. 5 is a view for explaining a process of transmitting an uplink signal by a UE to monitor a femto BS according to an embodiment of the present invention. In this case, the uplink signal is a fast feedback channel.

Referring to FIG. 5, a macro BS instructs the UE to transmit a fast feedback channel (FFBCH) in a frame #k3 according to Tx power P3 pre-determined or defined by the macro BS. By considering a delay of a backbone network and to provide a sufficient time to the femto BS for preparation of monitoring, the instruction is performed in a frame #L (L<<k3) located ahead of the frame #k3. If the uplink signal is a sounding channel, the macro BS announces in advance to the femto BS a sequence used for the sounding channel.

Figure 6:
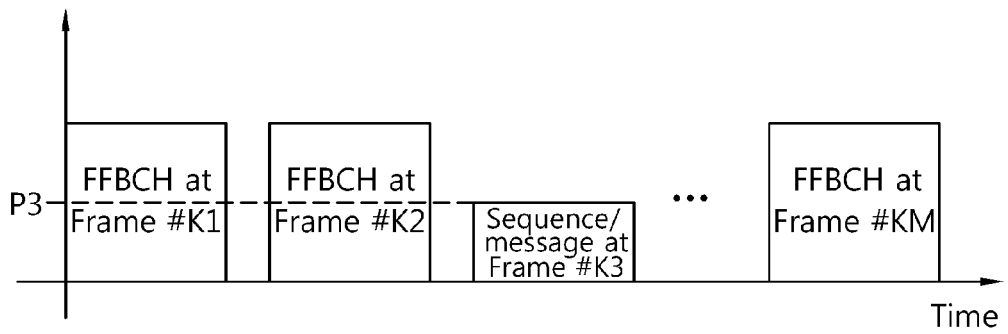
FIG. 6 is a view for explaining a process of transmitting an uplink signal by a UE to monitor a femto BS according to another embodiment of the present invention.

FIG. 6 is a view for explaining a process of transmitting an uplink signal by a UE to monitor a femto BS according to another embodiment of the present invention. In this case, the uplink signal is a sequence and/or a message.

Referring to FIG. 6, a macro BS instructs the UE to transmit the sequence and/or the message instead of a fast feedback channel in a frame #k3 according to Tx power P3 pre-determined or defined by the macro BS. The instruction may be determined by the macro BS or may be performed in a pre-agreed Manner. Herein, the sequence may be used as a pilot for a decoding message. The message may include information regarding Tx power of the uplink signal. By considering a delay of a backbone network and to provide a sufficient time to the femto BS for preparation of monitoring, the instruction is performed in a frame #L (L<<k3) located ahead of the frame #k3. The macro BS may report to the femto BS that the sequence and/or the message will be transmitted in the frame #k3.

Figure 7:
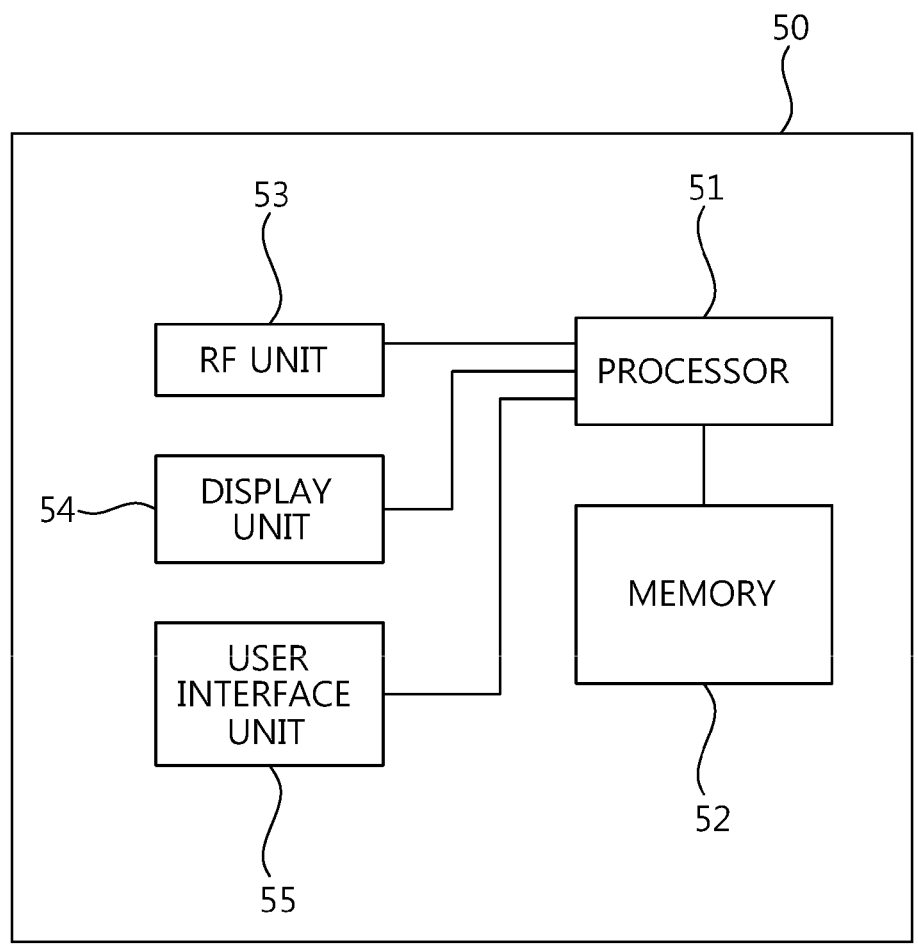
FIG. 7 is a block diagram showing an apparatus for performing a handover according to the present invention.

FIG. 7 is a block diagram showing an apparatus for performing a handover according to the present invention.

Referring to FIG. 7, an apparatus 50 for performing a handover includes a processor 51, a memory 52, a radio frequency (RF) unit 53, a display unit 54, and a user interface unit 55. Layers of a radio interface protocol are implemented in the processor 51. The processor 51 provides a control plane and a user plane. A function of each layer can be implemented in the processor 51.

The processor 51 monitors an uplink signal transmitted from a UE to a macro BS, transmits a handover initiation message to the macro BS on the basis of a result of comparing the uplink signal's strength obtained by the monitoring with a reference value, and performs a handover of the UE from the macro BS. The memory 52 is coupled to the processor 51 and stores an operating system of the UE, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing a handover by a femto base station in a wireless communication system, the method comprising:
    monitoring an uplink signal transmitted from a user equipment (UE) to a macro base station, wherein the uplink signal is monitored at resources indicated by resource information related to the uplink signal when the femto base station has received the resource information from the macro base station, otherwise another uplink signal is monitored at a dedicated periodic ranging slot of the macro base station;
    obtaining an uplink transmission power value used by the UE to transmit the uplink signal;
    estimating a distance between the UE and the femto base station based on the uplink transmission power value and a value regarding the monitored uplink signal's strength; and
    transmitting a handover initiation message to the macro base station if the estimated distance satisfies a condition to indicate a proximity of the UE to the femto base station.

2. The method of claim 1, wherein the femto base station is a closed subscriber group (CSG) femto base station.

3. The method of claim 1, wherein if the estimated distance satisfies the condition to indicate a proximity of the UE to the femto base station, the UE exists in a coverage of the femto base station.

4. A femto base station for performing a handover in a wireless communication system, the femto base station comprising:
    a radio frequency (RF) unit for transmitting and receiving a radio signal; and
    a processor coupled to the RF unit,
    wherein the processor:
        monitors an uplink signal transmitted from a user equipment (UE) to a macro base station, wherein the uplink signal is monitored at resources indicated by resource information related to the uplink signal when the femto base station has received the resource information from the macro base station, otherwise another uplink signal is monitored at a dedicated periodic ranging slot of the macro base station,
        obtains an uplink transmission power value used by the UE to transmit the uplink signal,
        estimates a distance between the UE and the femto base station based on the uplink transmission power value and a value regarding the monitored uplink signal's strength, and
        transmits a handover initiation message to the macro base station if the estimated distance satisfies a condition to indicate a proximity of the UE to the femto base station.

5. The femto base station of claim 4, wherein the processor provides a service to a closed subscriber group (CSG).

6. The femto base station of claim 4, wherein the processor performs monitoring on a user equipment group, the user equipment group comprising a plurality of user equipment connected to the macro base station.

* * * * *